US012769983B2

(12) United States Patent
Huang

(10) Patent No.: US 12,769,983 B2
(45) Date of Patent: Oct. 20, 2026

(54) SWITCHED NEURAL NETWORKS

(71) Applicant: GM Cruise Holdings LLC, San Francisco, CA (US)

(72) Inventor: Albert Huang, Sunnyvale, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 614 days.

(21) Appl. No.: 18/352,645

(22) Filed: Jul. 14, 2023

(65) Prior Publication Data

US 2025/0021795 A1 Jan. 16, 2025

(51) Int. Cl.
*B60W 60/00* (2020.01)
*G06N 3/045* (2023.01)
*G06N 3/084* (2023.01)

(52) U.S. Cl.
CPC ........... *G06N 3/045* (2023.01); *B60W 60/001* (2020.02); *G06N 3/084* (2013.01)

(58) Field of Classification Search
CPC ...... G06N 3/045; G06N 3/084; B60W 60/001
See application file for complete search history.

(56) References Cited

U.S. PATENT DOCUMENTS 6,601,052 B1 * 7/2003 Lee .......................... G06N 3/09
706/14
2018/0107215 A1 * 4/2018 Djuric ............... B60W 60/0016
2019/0065951 A1 * 2/2019 Luo ........................ G06N 3/098
2020/0174490 A1 * 6/2020 Ogale ................. B60W 60/001
2021/0042612 A1 * 2/2021 Nosko .................... G06N 3/045
2022/0111859 A1 * 4/2022 Lu ........................ G06N 3/0464
2022/0114805 A1 * 4/2022 Jarquin Arroyo ........ G06N 3/08
2022/0180178 A1 * 6/2022 Tasinga ............... G06F 11/3457
2024/0160905 A1 * 5/2024 Yu .......................... G06N 3/063
2025/0094825 A1 * 3/2025 Yu .......................... G06N 3/045

OTHER PUBLICATIONS

Peng-Wei Lin, et al.; Lightweight Convolutional Neural Networks with Model-Switching Architecture for Multi-Scenario Road Semantic Segmentation, Applied Sciences, dated Aug. 12, 2021, 14 pages.

* cited by examiner

*Primary Examiner* — Jorge A Casanova
(74) *Attorney, Agent, or Firm* — CANTOR COLBURN LLP

(57) ABSTRACT

The present disclosure generally relates to switched neural networks for controlling operations related to autonomous vehicles. An example method can include determining an operating condition for an autonomous vehicle; determining, from a plurality of sub-neural networks of a neural network, a sub-neural network configured for the operating condition, wherein each of the plurality of sub-neural networks is configured to perform a task based on a different operating condition for the autonomous vehicle; and performing the task using the sub-neural network configured for the operating condition.

17 Claims, 6 Drawing Sheets

SWITCHED NEURAL NETWORKS

BACKGROUND

1. Technical Field

The present disclosure generally relates to switched neural networks for controlling operations and, more specifically, determining an operating condition for an autonomous vehicle and using a sub-neural network configured for the operating condition to perform a task related to the operation of the autonomous vehicle.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Deep learning neural networks can be used by the internal computing system of the autonomous vehicle to use the data and measurements to control a mechanical system of the autonomous vehicle. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
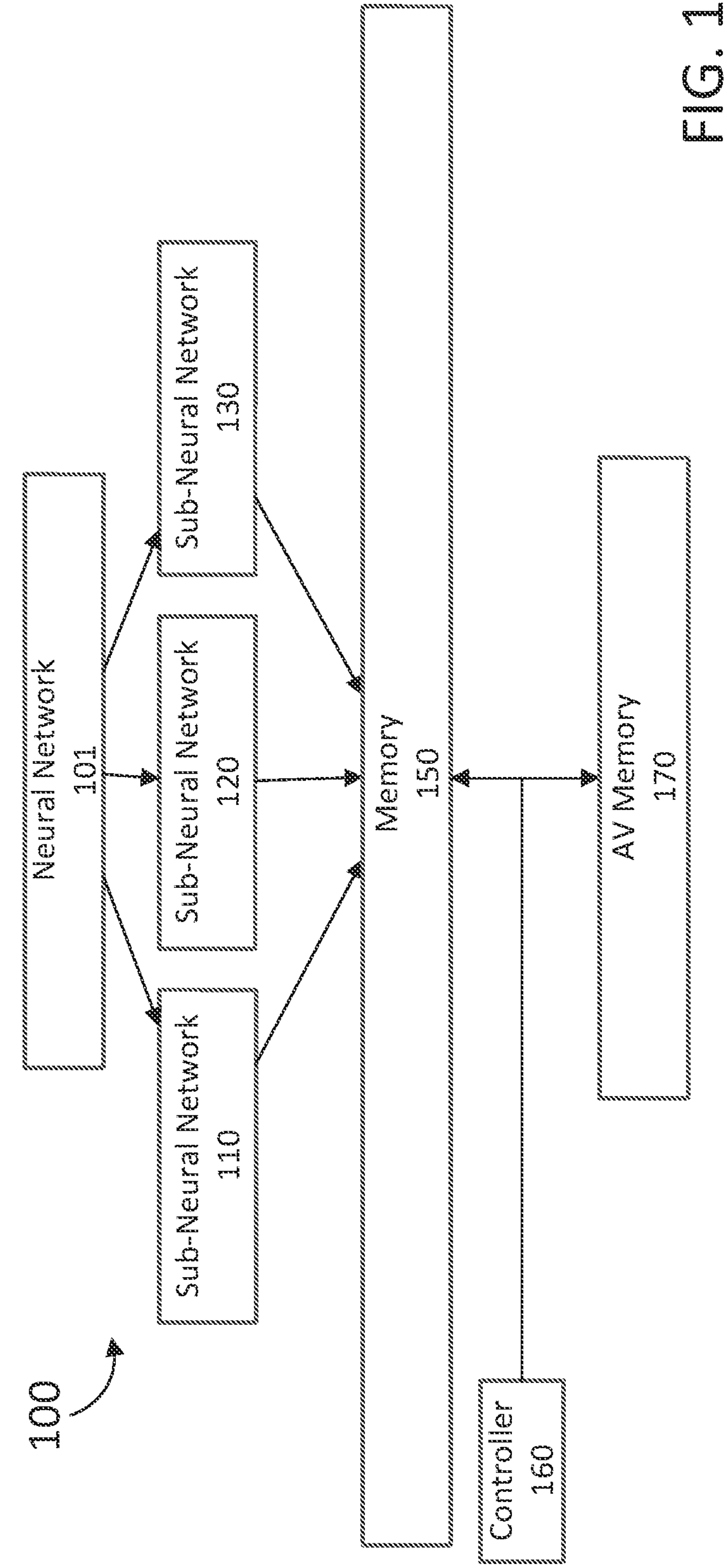
FIG. 1 illustrates a diagram of an example system for performing, using a sub-neural network configured for an operating condition, a task related to an autonomous vehicle (AV), according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Neural networks can be used by a number of systems and devices to perform various tasks. For example, neural networks can be used by autonomous vehicles (AVs) to perform tasks related to the operation of the AVs as the AVs navigate an environment. To illustrate, neural networks can be used to implement a perception module (or perception system) of an AV to perform perception tasks as discussed in more detail below. In some examples, neural networks can be used for tasks that include, but are not limited to, object detection, object tracking, prediction tasks, recognition tasks, path planning, motion planning, generative tasks, and more. In some cases, neural networks implemented to perform tasks related to the operation of a system, such as an AV, can become large and use large amounts of computing capacity to operate. In some examples, neural networks can have representational power that is dependent on the size (e.g., the number of parameters) of the neural network. Accordingly, systems such as an AV using neural networks can become computationally constrained when the system (e.g., the AV) has limited computing capacity and/or the neural networks consume a certain amount of computing capacity.

The computational footprint of neural networks can be particularly large in certain applications such as AV applications. In some AVs, the computing capacity can be large enough to accommodate large neural networks. However, some AVs may include less computing capacity (and therefore be less powerful) than other AVs. In some cases, a reduction in an AV computing capacity can be a result of cost or economic considerations. For example, companies developing AVs may reduce the computing capacity of each AV to achieve cost optimization. It is estimated that the computing capacity of some AVs may be reduced by as much as 50% to 75% of the computing capacity available in many AVs as profitability concerns (among others) are addressed. In some examples, AVs with reduced computing capacities can be custom developed and scaled.

Described herein are systems, apparatuses, processes (also referred to as methods), and computer-readable media (collectively referred to as "systems and techniques") for improving the computing efficiency of neural networks and/or reducing the compute footprint of neural networks without (or with minimal) a reduction in a neural network performance. For example, in some aspects, the systems and techniques described herein can achieve at least the same level of performance as larger neural networks implemented by systems such as AVs with high amount (or a threshold amount) of computing capacity, while using less computing capacity than the larger neural networks. The systems and techniques described herein can be applied in any application that uses a neural network(s) to perform one or more tasks and can benefit from an increased computational efficiency associated with the neural network(s), a reduced compute footprint associated with the neural network(s), an increased performance of the neural network(s), and/or any of the other advantages and benefits described herein. For example, the systems and techniques described herein can be implemented in other applications such as other autonomous systems (e.g., unmanned aerial vehicles, robotic systems, etc.), other computing devices, imaging systems (e.g., camera devices, scanners, etc.), processing devices, manufacturing systems, medical systems, smart appliances, and portable computing devices, among others. However, for illustration and explanation purposes, the systems and techniques described herein will be discussed with respect to an application involving an autonomous vehicle(s).

One example approach to fitting neural networks onto AV computing systems with reduced computing capacity is to develop improved neural networks that use less memory. Another example approach to fitting neural networks onto AV computing systems with reduced computing capacity is to divide the neural networks into smaller complimentary neural networks and develop and utilize switched neural networks. For example, a comparable level of performance can be achieved by subdividing the neural networks into multiple complementary sub-neural networks based on different operating conditions of the AV. The operating conditions can include daytime operating conditions, nighttime operating conditions, and/or dusk/twilight operating conditions, among others. In some examples, the daytime, twilight/dusk, and nighttime operating conditions can be distinguished based on the amount of light present in the environment wherein various threshold levels of light can indicate which condition (e.g., daytime, twilight/dusk, or nighttime) is present. In other examples, the daytime, twilight/dusk, and nighttime operating conditions can be distinguished based on a time of day, or any other understandable metric.

In this example, a controller in the AV's computing system can dynamically monitor the AV operating condition and load into memory (e.g., system or processor (CPU, GPU, etc.) memory and/or other memory) the sub-neural network corresponding to the operating condition without loading into the memory the full neural network or other sub-neural networks that are not needed or used for the operation condition. For example, during daytime operation, the sub-neural network corresponding to daytime operation can be loaded into the AVs memory, and subsequently as dusk approaches, the sub-neural network corresponding to the dusk/twilight operating condition can be loaded into the AVs memory (and the sub-neural network corresponding to daytime operation can be removed from the memory). The sub-neural networks not loaded into the memory can be stored in less expensive storage (e.g., non-volatile memory, etc.), and loaded into memory when needed.

FIG. 1 illustrates a diagram of an example neural network system 100 that includes multiple sub-neural networks configured for respective operating conditions associated with a task. In particular, FIG. 1 illustrates a diagram of an example system 100 for performing a task using a sub-neural network configured for an operating condition (e.g., sub-neural networks 110, 120, and 130) associated with the task. In this example, the task relates to an AV (e.g., AV 502, illustrated in FIG. 5). However, the system 100 can be implemented for tasks related to other applications, such as other autonomous systems (e.g., unmanned aerial vehicles, autonomous devices, etc.), robotic applications, smart appliances, computing systems, manufacturing systems, imaging systems (e.g., camera systems, scanners, etc.), medical systems, industrial systems, and others.

In the example shown in FIG. 1, an example neural network 101 can be used by an AV to perform tasks related to the operation of the AV. Non-limiting example tasks that can be performed by the example neural network 101 include object detection, object tracking, prediction tasks, path planning, motion planning, recognition tasks, orchestration tasks, generative tasks, classification tasks, and more. In some examples, neural network 101 can be used to implement a perception module (or perception system) of an AV to perform perception tasks as discussed below. In other examples, neural network 101 can additionally or alternatively be used by the AV for behavior and planning tasks, among other tasks. One example neural network 101 that can be used to perform the processes described here is the deep learning neural network 400 described with respect to FIG. 4 below. However, any neural network capable of performing tasks related to the operation of AVs can be suitable.

One example implementation of the system described with regard to FIG. 1 is to train a plurality of sub-neural networks (e.g., sub-neural networks 110, 120, and 130) to perform a task (e.g., object detection), with each sub-neural network optimized (e.g., trained and/or modified/tuned) to perform that task under a different operating condition. For example, in the case where neural network 101 is trained to perform object detection for the AV (under all or a number of different operating conditions), sub-neural networks 110, 120, and 130 can be trained to perform object detection for the AV with each sub-neural network (e.g., sub-neural networks 110, 120, and 130) being optimized to perform the object detection for the AV under a different operating condition. A sub-neural network can be optimized to perform a task under a particular operating condition when the sub-neural network is trained for the particular operating condition, configured/designed to (and/or confirmed to) perform better for that particular operating condition than other sub-neural networks, modified to include components (e.g., parameters, layers, etc.) used for that particular operating condition and exclude other components that are not used for that particular operating condition and/or are estimated (and/or determined) to provide less than a threshold increase (or no increase) of a performance of the sub-network for that particular operating condition, modified to include components (e.g., parameters, layers, etc.) that have a better performance for that particular operating condition than other components of other sub-networks and/or of the sub-network prior to being optimized for the particular operating condition, and/or otherwise adjusted to provide a desired and/or threshold performance for the particular operating condition.

The particular operating condition associated with a sub-network can include any operating condition such as, for example and without limitation, an environment condition (e.g., weather, visibility and/or lighting conditions, congestion, etc.), a road condition, a traffic condition, an operating constraint, a scene condition (e.g., a feature(s) and/or characteristic(s) of a scene, a type of scene, etc.), a time-of-day, a geographic area, a condition and/or factor that can impact a performance of the system implementing the sub-network (e.g., the AV) and/or needs to be accounted by the sub-network, among others. In one example, sub-neural network 110 can be optimized to perform a task (e.g., object detection, object recognition, classification, navigation, etc.) for the AV under daylight conditions, sub-neural network 120 can be optimized to perform object detection for the AV under dusk/twilight conditions, and sub-neural network 130 can be optimized to perform object detection for the AV under nighttime conditions. In another example, sub-neural network 110 can be optimized to perform a task (e.g., object detection, object recognition, classification, navigation, etc.) for the AV under wet (e.g., raining, snowing, etc.) conditions, sub-neural network 120 can be optimized to perform the task for the AV under dry and/or sunny conditions, and sub-neural network 130 can be optimized to perform a task for the AV in environments/scenes with less than a threshold visibility (e.g., cloudy conditions, foggy conditions, etc.). The example operating conditions (e.g., daylight conditions, dusk/twilight conditions, and nighttime conditions) discussed above are merely illustrative examples provided for explanation purposes. It should be noted that sub-neural networks 110, 120, and 130 can be optimized for any other operating conditions. Further, although FIG. 1 illustrates three sub-neural networks, it is understood that the system 100 described herein is not limited to three sub-neural networks but can be implemented using any number of sub-neural networks (including more than three operating conditions or less than three sub-neural networks). Any type or number of sub-neural networks can be implemented according to system 100. Additionally, while in this example sub-neural networks 110, 120, and 130 are discussed as being optimized (e.g., trained, etc.) for object detection, it is understood the sub-neural networks can be optimized for any other suitable task related to the operation of a system (e.g., an AV, etc.) implementing the neural network described herein.

Each of sub-neural networks 110, 120, and 130 can be stored in a non-volatile memory (e.g., memory 150) of the AV, until a controller (e.g., controller 160) instructs a computing system of the AV to load one of the sub-neural networks (e.g., sub-neural network 110, 120, or 130) into the AV memory 170. In some examples, the AV memory 170 can include volatile memory such as random-access memory (RAM), dynamic RAM (DRAM), static RAM (SRAM), synchronous dynamic RAM (SDRAM), system cache, and/or any other volatile memory and/or cache. In some aspects, the AV memory 170 can include system or processor memory (e.g., CPU memory, GPU memory, etc.), system cache, volatile memory and/or cache of a circuit (e.g., a system-on-chip (SoC), a field programmable gate array (FPGA), an application-specific integrated circuit (ASIC), etc.) and/or other volatile memory and/or cache. In some examples, memory 150 can be a non-volatile and/or non-transitory memory and/or computer-readable memory device. For example, memory 150 can be, but is not limited to, a hard disk device, a read-only memory (ROM), an erasable programmable ROM (EPROM), or other types of computer readable media that can store data accessible by a computer, such as a magnetic cassette, a flash memory card, a solid state memory device (e.g., a solid-state drive or SSD), a digital versatile disk, a cartridge, a floppy disk, a flexible disk, a hard disk, a magnetic tape, any other magnetic storage medium, flash memory, memristor memory, and/or any other solid-state memory. In some examples, AV memory 170 can include memory and/or cache of a CPU, a GPU, an ASIC, an FPGA, an SoC, and/or any other processing device or integrated circuit. In some scenarios, memory 150 can include more capacity for storage than AV memory 170.

Controller 160 can detect that an operating condition in the AVs environment has changed to a different operating condition (e.g., it has become darker during twilight as the sun sets, the weather has changed, a road condition has changed, a type of environment has changed, etc.), and instruct the sub-neural network (e.g., sub-neural network 120) optimized for the different operating condition (e.g., twilight, a different weather condition, a different road condition, a different type of environment, etc.) to be loaded into AV memory 170. In some examples, the controller 160 can be human controlled. In other examples, the controller 160 can be controlled by hardware and/or software. For example, the controller 160 can be controlled by software (e.g., software logic, a function, an application, an algorithm, a neural network, etc.) configured to automatically instruct the AV computing system to load a sub-neural network into AV memory 170 based on a predetermined trigger and/or threshold (e.g., a time-of-day, a weather condition, a visibility condition, an environment condition, a traffic condition, a road condition, etc.). In some cases, the controller 160 can determine that the predetermined trigger and/or threshold is met based on data received from a sensor indicating a changed condition, a set of rules, etc. In some examples, the controller 160 can instruct the AV computing system to load a sub-neural network into AV memory 170 based on a determined change in the operating conditions. In other examples, controller 160 can be a deep learning neural network itself (such as the deep learning neural network 400 described with respect to FIG. 4 below) that can be trained to learn when to switch sub-neural networks.

In some examples, sub-neural networks 110, 120, and 130 can be trained to perform the AV task based on different operating conditions. In some examples, sub-neural networks 110, 120, and 130 can be trained to perform the AV task based on partially overlapping operating conditions. For example, while sub-neural network 110 can be trained and/or configured to perform the task for daytime conditions and sub-neural network 120 can be trained and/or configured to perform the task for dusk/twilight, sub-neural networks 110 and 120 can also be trained and/or configured to perform the task for a same or overlapping operating condition. For example, sub-neural network 110 can be trained and/or configured to perform AV tasks under conditions above a first threshold of darkness, and sub-neural network 120 can be optimized to perform AV tasks under conditions below a second threshold of darkness where the first and second thresholds are different but partially overlap (e.g., there is an overlapping amount of darkness between the first threshold of darkness and the second threshold of darkness). Therefore, in some examples, sub-neural network 110 can perform tasks during operating condition (e.g., early twilight hours) that partially overlaps with the operating condition (e.g., when daylight increases in the morning) associated with the sub-neural network 120.

In some cases, operating conditions can change rapidly (e.g., at a threshold frequency and/or amount of time) and fluctuate. Therefore, training sub-neural network 110 to perform a task for an operating condition that partially overlaps with an operating condition associated with sub-neural network 120 can provide safety benefits. For example, training sub-neural network 110 to perform tasks during early twilight hours and training sub-neural network 120 to perform tasks as daylight appears in the early morning can provide certain safety benefits for the AV. In some scenarios, overlapping optimization of two or more sub-neural networks can provide a smoother transition when the controller 160 instructs the system to switch between sub-neural networks. In some cases, overlapping optimization of two or more sub-neural networks can also improve the safety and/or operation of the AV.

Figure 2:
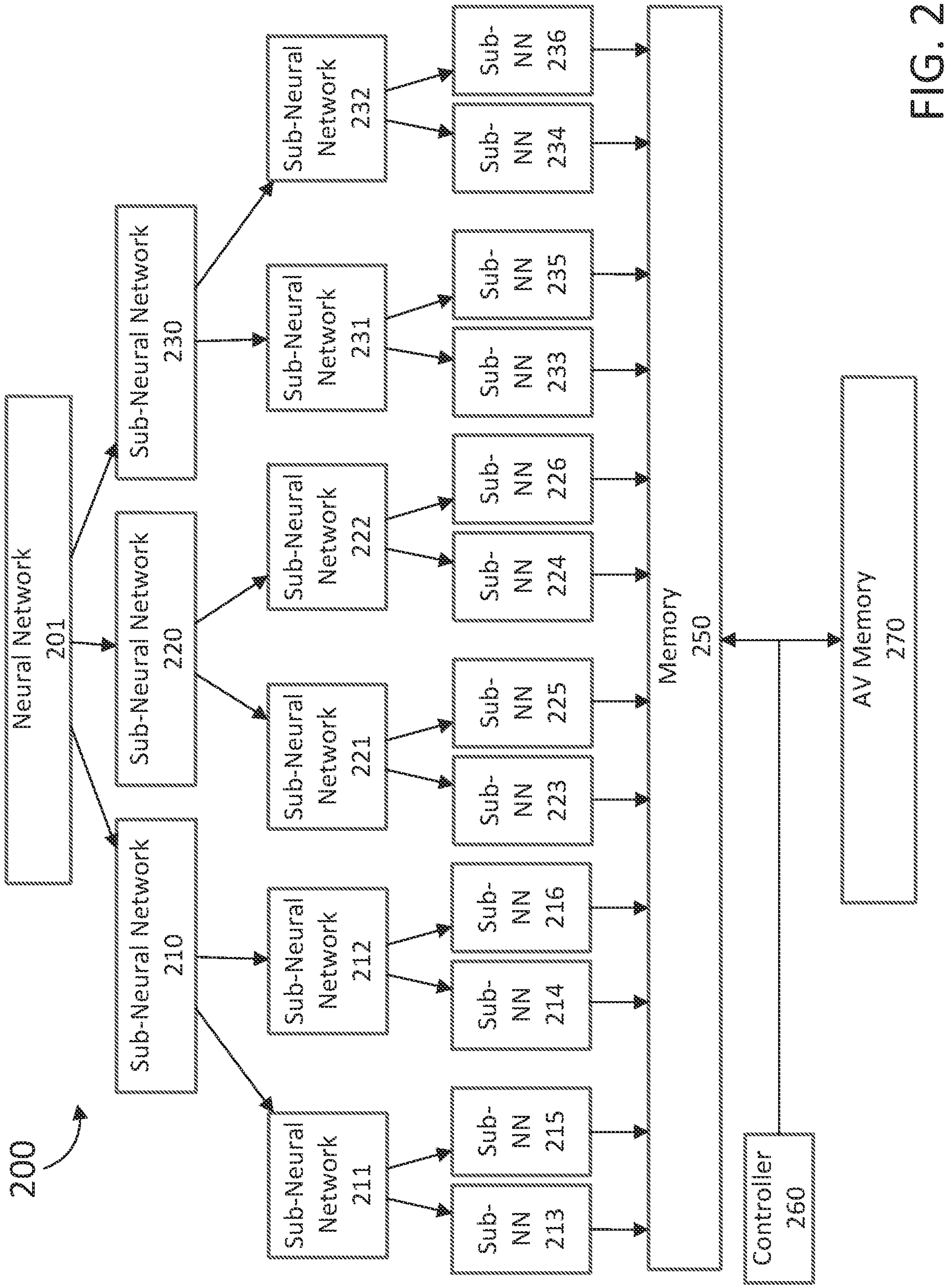
FIG. 2 illustrates a diagram of another example system for performing, using a sub-neural network configured for an operating condition, a task related to an AV, according to some aspects of the disclosed technology.

FIG. 2 illustrates a diagram of another example system 200 for performing a task using a sub-neural network (e.g., sub-neural network 213, 214, 215, 216, 223, 224, 225, 226, 233, 234, 235, or 236) configured for an operating condition associated with the task. In the examples provided below, the task relates to an AV (e.g., AV 502, illustrated in FIG. 5). However, as noted above, the task can relate to any other system and/or application.

In FIG. 2, the neural network 201 includes a first level of sub-neural networks (e.g., sub-neural networks 210, 220, 230), a second level of sub-neural networks (e.g., sub-neural networks 211, 212, 221, 222, 232, 232), and a third level of sub-neural networks (e.g., sub-neural network 213, 214, 215, 216, 223, 224, 225, 226, 233, 234, 235, 236). The number of levels and sub-neural networks in FIG. 2 are merely illustrative examples provided for explanation purposes. In other examples, the neural network 201 can include more or less levels and/or sub-networks than shown in FIG. 2.

An example neural network 201 can be used by an AV to perform tasks related to the operation of the AV. Example neural network 201 can be analogous or similar to neural network 101 described above with respect to FIG. 1. As discussed above, in an example implementation of the system, a plurality of sub-neural networks (e.g., sub-neural networks 210, 220, and 230) can be trained and/or configured to perform a task but each sub-neural network can be trained, configured, and/or adjusted to perform the task under a different operating condition (e.g., each sub-neural network can be trained and/or configured to perform the task under a respective operating condition with higher accuracy, efficiency, and/or stability than other operating conditions associated with other sub-neural networks). For example, sub-neural network 210 can be trained, configured, and/or adjusted to perform object detection for the AV under daylight conditions, sub-neural network 220 can be trained, configured, and/or adjusted to perform object detection for the AV under dusk/twilight conditions, and sub-neural network 230 can be trained, configured, and/or adjusted to perform object detection for the AV under nighttime conditions. These are merely example operating conditions (e.g., daylight conditions, dusk/twilight conditions, and nighttime conditions). In other examples, sub-neural networks 210, 220, and 230 can be trained, configured, and/or adjusted for any other operating conditions. Further, although FIG. 2 illustrates three sub-neural networks at a first level (e.g., sub-neural networks 210, 220, and 230), in other examples, the first level can include more or less than three sub-neural networks. Any type or number of sub-neural networks can be implemented at the first level.

Moreover, the sub-neural networks 210, 220, and 230 can be further fine-tuned for additional operation conditions. For example, sub-neural networks 210, 220, and 230 can be trained and/or configured to perform the task under a second respective operating condition in addition to the first respective operating condition. The second respective operating condition can include any other operating condition such as, for example and without limitation, a weather condition, an environment condition, a type of scene, a road condition, a traffic condition, etc. In the examples below, the first respective operating condition will be described with respect to time-of-day or lighting conditions, and the second respective operating condition will be discussed with respect to weather conditions. For example, sub-neural network 211 can be trained and/or configured to perform the task for daytime conditions (e.g., first respective operating condition) and clear/sunny weather conditions (e.g., second respective operating condition), sub-neural network 212 can be trained and/or configured to perform the task in daytime conditions (e.g., first respective operating condition) and rainy weather conditions (e.g., second respective operating condition), sub-neural network 221 can be trained and/or configured to perform the task in twilight/dusk conditions (e.g., first respective operating condition) and lower visibility and/or foggy conditions (e.g., second respective operating condition), sub-neural network 222 can be trained and/or configured to perform the task in twilight/dusk conditions (e.g., first respective operating condition) and icy weather conditions (e.g., second respective operating condition), sub-neural network 231 can be trained and/or configured to perform the task in nighttime conditions (e.g., first respective operating condition) and clear/sunny weather conditions (e.g., second respective operating condition), and sub-neural network 232 can be trained and/or configured to perform the task in nighttime conditions (e.g., first respective operating condition) and rainy weather conditions (e.g., second respective operating condition). These are merely example operating conditions (e.g., time-of-day or visibility conditions, weather conditions). In other examples, sub-neural networks 211, 212, 221, 222, 231, and 232 can be trained and/or configured to perform the task in any other operating conditions. Further, although FIG. 2 illustrates six sub-neural networks at the second level of the neural network 201 (e.g., sub-neural networks 211, 212, 221, 222, 231, and 232), it is understood that the second level can include more or less than six sub-neural networks. Any type or number of sub-neural networks can be implemented at the second level.

In the example shown in FIG. 2, the sub-neural networks can be further fine-tuned for additional operation conditions. For example, sub-neural networks 211, 212, 221, 222, 231, and 232 can be trained and/or configured to perform the task in a third respective operating condition in addition to the first and second respective operating conditions. For example, the sub-neural networks 211, 212, 221, 222, 231, and 232 can be further trained and/or configured to perform the task in another respective environment condition or type of environment (e.g., the third respective operating condition) such as, for example, an urban condition, a rural condition, a highway condition, an off-road condition, a mountainous condition, etc. To illustrate, sub-neural network 213 can be trained and/or configured to perform the task in a daytime condition (e.g., first respective operating condition), a clear/sunny weather condition (e.g., second respective operating condition), and an urban condition (e.g., third respective operating condition); sub-neural network 215 can be trained and/or configured to perform the task in a daytime condition, a clear weather condition, and a rural condition; sub-neural network 214 can be trained and/or configured to perform the task in a daytime condition, a rainy weather condition, and an urban condition; sub-neural network 216 can be trained and/or configured to perform the task in a daytime condition, a rainy weather condition, and an off-road condition; sub-neural network 223 can be trained and/or configured to perform the task in a twilight/dusk condition, a clear/sunny weather condition, and an urban condition; sub-neural network 225 can be trained and/or configured to perform the task in a twilight/dusk condition, a clear/sunny weather condition, and a rural condition; sub-neural network 224 can be trained and/or configured to perform the task in a twilight/dusk condition, an icy weather condition, and an urban condition; sub-neural network 226 can be trained and/or configured to perform the task in a twilight/dusk condition, a rainy weather condition, and a rural condition; sub-neural network 233 can be trained and/or configured to perform the task in a nighttime condition, a clear/sunny weather condition, and an urban condition; sub-neural network 235 can be trained and/or configured to perform the task in a nighttime condition, a clear weather condition, and an off-road condition; sub-neural network 234 can be trained and/or configured to perform the task in a nighttime condition, a rainy weather condition, and an urban condition; and sub-neural network 236 can be trained and/or configured to perform the task in a nighttime condition, a rainy weather condition, and a rural condition. These are merely example operating conditions (e.g., time-of-day conditions, weather conditions, type of environment conditions). In other examples, sub-neural networks 213, 214, 215, 216, 223, 224, 225, 226, 233, 234, 235, and 236, can be trained and/or configured to perform the task in any other operating condition(s). Further, although FIG. 2 illustrates twelve sub-neural networks at the third level of the neural network (e.g., sub-neural networks 213, 214, 215, 216, 223, 224, 225, 226, 233, 234, 235, and 236), the third level of the neural network can include more or less sub-neural networks than shown in FIG. 2. Any type or number of sub-neural networks can be implemented at the third level of the neural network. Additionally, sub-neural networks 213, 214, 215, 216, 223, 224, 225, 226, 233, 234, 235, and 236 can be trained and/or configured to perform the task based on partially overlapping operating conditions among any of the plurality of sub-neural networks.

Each of sub-neural networks 213, 214, 215, 216, 223, 224, 225, 226, 233, 234, 235, and 236 can be stored in a non-volatile memory (e.g., memory 250) of the AV, until a controller (e.g., controller 260) instructs the AVs computing system to load one of the sub-neural networks (e.g., sub-neural networks 213, 214, 215, 216, 223, 224, 225, 226, 233, 234, 235, and 236) into the AV memory 270. The memory 250 can be the same or different than the memory 150 shown in FIG. 1. In some examples, memory 250 can be a non-volatile and/or non-transitory computer-readable medium or memory device similar to (or same as) memory 150 discussed with reference to FIG. 1. In some examples, AV memory 270 can include any volatile memory and/or cache, and can be the same or different than AV memory 170 illustrated in FIG. 1. In some examples, AV memory 270 can include a memory and/or cache of and/or used by a CPU, a GPU, an ASIC, an FPGA, an SoC, and/or any other processing device or integrated circuit similar to (or the same as) AV memory 170 discussed with reference to FIG. 1. In some scenarios, memory 250 can include more capacity for storage than AV memory 270. Controller 260 can detect that one or more operating condition of (and/or associated with) the AV has changed, and instruct a particular sub-neural network trained and/or configured to perform a task for that operating condition to be loaded into AV memory 270. In some examples, controller 260 can be analogous to (or same as) controller 160 discussed previously with reference to FIG. 1. In some examples, controller 260 can be, include, or use a deep learning neural network (such as the deep learning neural network 400 described with respect to FIG. 4 below) that can be trained to learn when to switch sub-neural networks.

Figure 3:
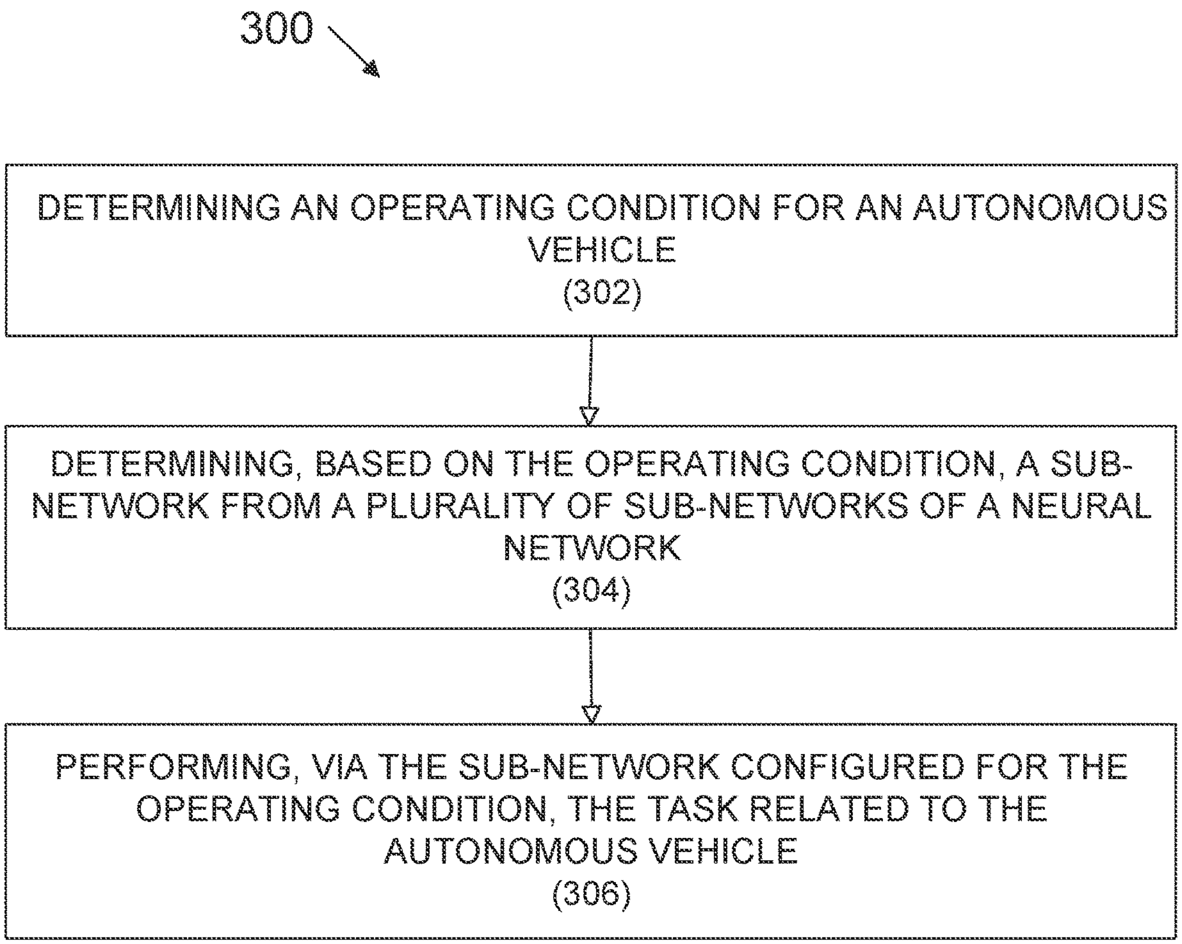
FIG. 3 illustrates a flow diagram of an example process for performing a task via a sub-network configured for an operating condition associated with the task, according to some aspects of the disclosed technology.

FIG. 3 illustrates a flow diagram of an example process 300 for performing a task using a sub-network (e.g., sub-neural networks 213, 214, 215, 216, 223, 224, 225, 226, 233, 234, 235, and 236) configured for an operating condition associated with the task. In the examples described below, the task relates to an AV. However, in other examples, the task can relate to any other system and/or application that can implement sub-neural networks for different operating conditions.

At block 302, the process 300 can include determining an operating condition for an AV. In some examples, an operating condition can be or include a condition related to an AV, such as a condition related to an AV's environment, a weather in which the AV is operating, a traffic condition in which the AV is operating, a visibility and/or lighting condition in the scene of the AV, a type of feature and/or characteristic of a scene of the AV, a type of obstacle(s) in a scene of the AV, a requirement of a scene of the AV, and/or any other condition(s). Example operating conditions can include, but are not limited to, time-of-day (e.g., daylight, twilight/dusk, nighttime, etc.), weather (e.g., clear, rainy, foggy, snowy, etc.), geographic (e.g., urban, rural, downtown, suburban, mountainous, off-road, etc.), road (e.g., icy, wet, dry, type of road surface, condition of road surface, etc.), traffic (e.g., above threshold traffic, below threshold traffic, etc.), or any other operating condition that an AV may encounter. Operating conditions do not need to be intuitive or human understandable. In some scenarios, the operating conditions can be determined based on sensor data received from sensors mounted on the AV. In some scenarios, operating conditions can be determined based on rules (such as a time of day or a geographic location, for example). In some scenarios, operating conditions can be determined by a human. It is contemplated that any condition related to the AVs environment can be an operating condition, and any way of an AV determining an operating condition can be implemented at block 302.

At block 304, the process 300 can include determining, based on the operating condition, a sub-network from a plurality of sub-networks of a neural network (e.g., sub-neural networks 213, 214, 215, 216, 223, 224, 225, 226, 233, 234, 235, and 236). In some examples, each of the plurality of sub-networks can be configured to perform a task based on a different operating condition for the AV. Example tasks can include, but are not limited to, object detection, object tracking, prediction tasks, recognition tasks, classification tasks, path planning, motion planning, and/or any other task. In some scenarios, example tasks can include any suitable behavior, detection tasks, prediction tasks, and/or planning tasks related to the operation of the AV. In some examples, each of the plurality of sub-networks (e.g., sub-neural networks 213, 214, 215, 216, 223, 224, 225, 226, 233, 234, 235, and 236) can be configured to perform the same task, but under different operating conditions for the AV. The neural network can include two or more sub-neural networks, including more or less sub-neural networks than (or the same amount of sub-neural networks as) shown in FIG. 1 or FIG. 2. Moreover, the neural network can include one or more levels of sub-neural networks, including the same or more levels of sub-neural networks as shown in FIG. 1, or including the same, more or less levels of sub-neural networks as shown in FIG. 2. The sub-neural networks can be trained and/or configured to perform a task under any operating condition or any combination of operating conditions.

For example, a sub-neural network (e.g., sub-neural network 213) can be trained and/or configured to perform a task in a daytime condition, a clear weather condition, and an urban environment condition; another sub-neural network (e.g., sub-neural network 215) can be trained and/or configured to perform the task in a daytime condition, a clear weather condition, and a rural environment condition; another sub-neural network (e.g., sub-neural network 214) can be trained and/or configured to perform the task in a daytime condition, a rainy weather condition, and an urban environment condition; another sub-neural network (e.g., sub-neural network 216) can be trained and/or configured to perform the task in a daytime condition, a rainy weather condition, and a rural environment condition; another sub-neural network (e.g., sub-neural network 223) can be trained and/or configured to perform the task in a in a twilight/dusk condition, a clear weather condition, and an urban environment condition; another sub-neural network (e.g., sub-neural network 225) can be trained and/or configured to perform the task in a twilight/dusk condition, a clear weather condition, and a rural environment condition; another sub-neural network (e.g., sub-neural network 224) can be trained and/or configured to perform the task in a twilight/dusk condition, a rainy weather condition, and an urban environment condition; another sub-neural network (e.g., sub-neural network 226) can be trained and/or configured to perform the task in a twilight/dusk condition, a rainy weather condition, and a rural environment condition; another sub-neural network (e.g., sub-neural network 233) can be trained and/or configured to perform the task in a nighttime condition, a clear weather condition, and an urban environment condition; another sub-neural network (e.g., sub-neural network 235) can be trained and/or configured to perform the task in a nighttime condition, a clear weather condition, and a rural environment condition; another sub-neural network (e.g., sub-neural network 234) can be trained and/or configured to perform the task in a nighttime condition, a rainy weather condition, and an urban environment condition; and/or another sub-neural network (e.g., sub-neural network 236) can be trained and/or configured to perform the task in a nighttime condition, a rainy weather condition, and a rural environment condition.

In some examples, once the operating condition(s) is/are determined (at block 302), a controller (e.g., controller 160 or controller 260) can determine which of the sub-networks (e.g., sub-neural networks 213, 214, 215, 216, 223, 224, 225, 226, 233, 234, 235, and 236) of the neural network to load into the AV's memory (e.g., AV memory 170 or AV memory 270). For example, once the operating condition(s) is/are determined at block 302, a controller (e.g., controller 160 or controller 260) can determine which of the sub-networks of the neural network to load into volatile memory or cache from non-volatile memory/storage. The controller can determine which sub-networks of the neural network to load into volatile memory based on a detected operating condition. To illustrate, the sub-neural networks can be trained and/or configured to perform a task under different operating conditions, as previously described. Thus, based on the operating condition determined by the controller (e.g., when the controller detects an operating condition or operating condition threshold, when the controller detects a change to a different operating condition, etc.), the controller can select the sub-neural network trained and/or configured to perform the task in the operating condition determined by the controller. The controller can then load that sub-neural network into volatile memory and/or cache (and/or generate an instruction to trigger that sub-neural network to be loaded into volatile memory and/or cache).

In some examples, the controller can be human controlled. In other examples, the controller can include and/or can be controlled by software (e.g., software logic, a software function, an application, an algorithm, a neural network or model, etc.). For example, the controller can include software to automatically instruct the AV computing system to load a sub-neural network into volatile memory and/or cache (e.g., AV memory) based on a detected operating condition and/or a predetermined threshold (for example, a time of day, based on data received from a sensor indicating a changed condition, a set of rules, etc.). In some examples, the controller can instruct the AV computing system to load a sub-neural network into AV memory based on a determined change in an operating condition(s). In other examples, the controller can be or include a deep learning neural network (such as the deep learning neural network 400 described with respect to FIG. 4 below) that can be trained to learn when to optimally switch sub-neural networks.

For example, if an AV is operating at nighttime, during rain, in an urban environment, and the rain stops (but, in this example, it remains nighttime and the AV remains within an urban environment), the controller can determine that an operating condition has changed from “rainy” to “clear” in the AVs environment (while the other operating conditions have not changed). Based on this determination, the controller (e.g., controller 260) can determine that a different sub-neural network (e.g., sub-neural network 233) associated with the changed operating condition (and the remaining operating conditions) can be loaded into the AVs memory (e.g., AV memory 270). As discussed above with reference to FIG. 2, a sub-neural network (e.g., sub-neural network 233) can be trained and/or configured to perform a task under a particular operating condition or a combination of operating conditions, such as nighttime, a clear weather condition, and a urban environment condition, for example.

At block 306, the process 300 can include performing a task using the sub-neural network (e.g., sub-neural network 233) configured for the operating condition detected at block 304. In the examples provided below, the task relates to an AV. However, in other examples, the task can include any other type of task and can relate to any other system and/or application. To perform the task using the sub-neural network configured for the operating condition, the process 300 can load the sub-neural network to an AV memory (e.g., volatile memory and/or cache) and run/activate the sub-neural network (or trigger the sub-neural network to run/activate).

In some examples, once the determined sub-neural network (e.g., sub-neural network 233) has been loaded into the AV memory (e.g., AV memory 270), the AVs computing system can utilize the sub-neural network (e.g., sub-neural network 233) to perform a task(s) related to the operation of the AV. For example, sub-neural network 233 can be used by the AV computing system to implement a perception module (or perception system) of an AV to perform perception tasks. In some examples, sub-neural networks can be used for tasks that include, but are not limited to, object detection, object tracking, object prediction, path planning, object recognition, classification, navigation, motion planning, and/or any other AV tasks. In other examples, sub-neural network 233 can be used by the AV for any suitable behavior, prediction tasks, detection tasks, planning tasks, etc., including any tasks related to the operation of the AV.

Figure 4:
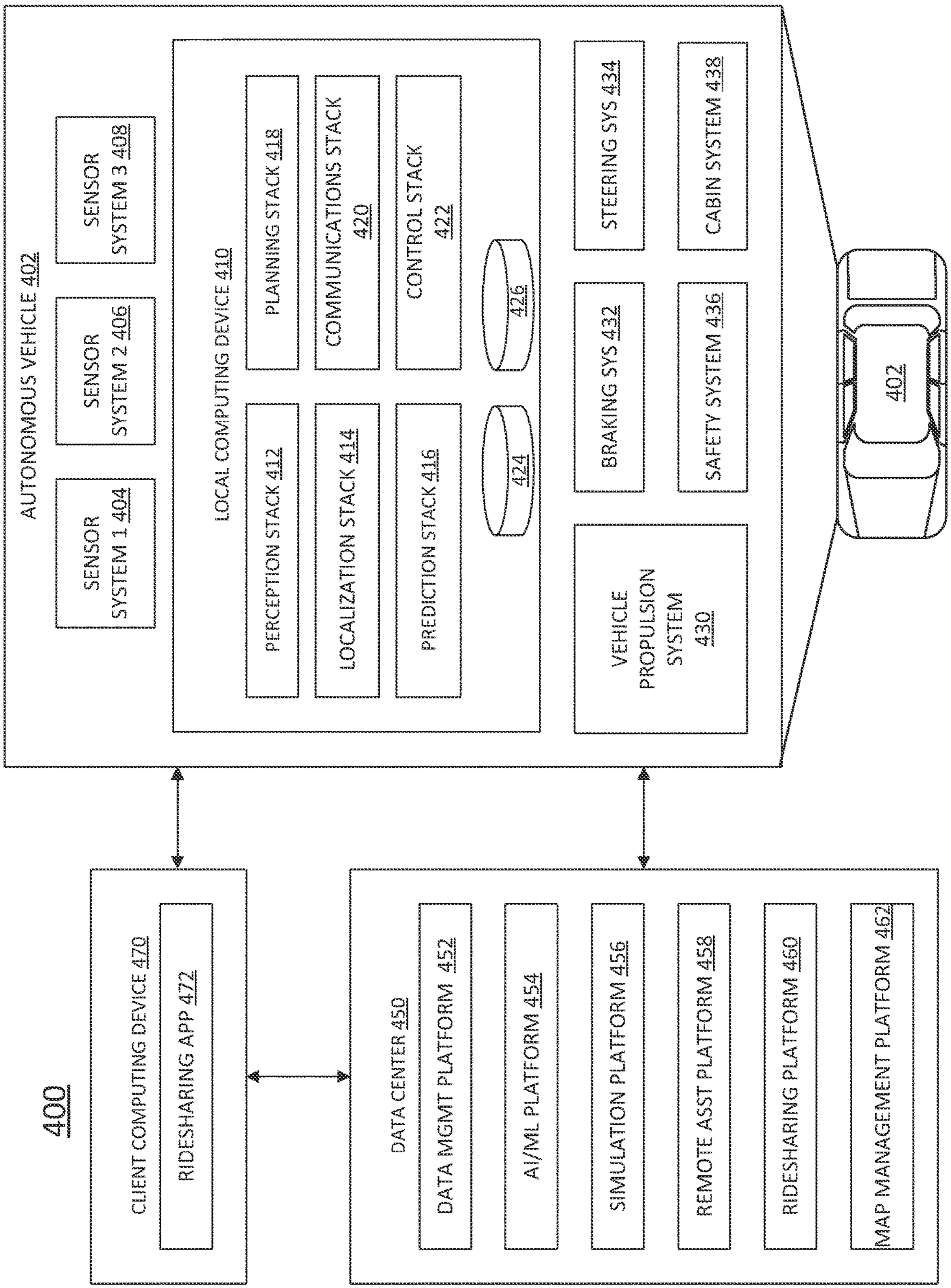
FIG. 4 illustrates an example system environment that can be used to facilitate AV dispatch and operations, according to some aspects of the disclosed technology.

FIG. 4 is a diagram illustrating an example AV environment 400, according to some examples of the present disclosure. One of ordinary skill in the art will understand that, for the AV environment 400 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 402 can implement any of the neural networks and sub-neural networks described above with respect to any of FIGS. 1 through 3. The AV 402 can implement the neural network and sub-neural networks as discussed with respect to any of FIGS. 1 through 3 to perform any task described herein under any operating condition and/or combination of operating conditions described herein. In some examples, the AV 402 can implement the process 300 described above with respect to FIG. 3.

The AV 402 can navigate roadways without a human driver based on sensor signals generated by multiple sensor systems 404, 406, and 408. The sensor systems 404-408 can include one or more types of sensors and can be arranged about the AV 402. For instance, the sensor systems 404-408 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other examples may include any other number and type of sensors.

The AV 402 can also include several mechanical systems that can be used to maneuver or operate the AV 402. For instance, the mechanical systems can include a vehicle propulsion system 430, a braking system 432, a steering system 434, a safety system 436, and a cabin system 438, among other systems. The vehicle propulsion system 430 can include an electric motor, an internal combustion engine, or both. The braking system 432 can include an engine brake, brake pads, actuators, and/or any other suitable componentry configured to assist in decelerating the AV 402. The steering system 434 can include suitable componentry configured to control the direction of movement of the AV 402 during navigation. The safety system 436 can include lights and signal indicators, a parking brake, airbags, and so forth. The cabin system 438 can include cabin temperature control systems, in-cabin entertainment systems, and so forth. In some examples, the AV 402 might not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

The AV 402 can include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a localization stack 414, a prediction stack 416, a planning stack 418, a communications stack 420, a control stack 422, an AV operational database 424, and an HD geospatial database 426, among other stacks and systems.

The perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the localization stack 414, the HD geospatial database 426, other components of the AV, and other data sources (e.g., the data center 450, the client computing device 470, third party data sources, etc.). The perception stack 412 can detect and classify objects and determine their current locations, speeds, directions, and the like. In addition, the perception stack 412 can determine the free space around the AV 402 (e.g., to maintain a safe distance from other objects, change lanes, park the AV, etc.). The perception stack 412 can identify environmental uncertainties, such as where to look for moving objects, flag areas that may be obscured or blocked from view, and so forth. In some examples, an output of the perception stack 412 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 414 can determine the AV's position and orientation (pose) using different methods from multiple systems (e.g., GPS, IMUs, cameras, LIDAR, RADAR, ultrasonic sensors, the HD geospatial database 426, etc.). For example, in some cases, the AV 402 can compare sensor data captured in real-time by the sensor systems 404-408 to data in the HD geospatial database 426 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The prediction stack 416 can receive information from the localization stack 414 and objects identified by the perception stack 412 and predict a future path for the objects. In some examples, the prediction stack 416 can output several likely paths that an object is predicted to take along with a probability associated with each path. For each predicted path, the prediction stack 416 can also output a range of points along the path corresponding to a predicted location of the object along the path at future time intervals along with an expected error value for each of the points that indicates a probabilistic deviation from that point.

The planning stack 418 can determine how to maneuver or operate the AV 402 safely and efficiently in its environment. For example, the planning stack 418 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another and outputs from the perception stack 412, localization stack 414, and prediction stack 416. The planning stack 418 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 418 can select from multiple backup plans to carry out. For example, while preparing to change lanes to turn right at an intersection, another vehicle may aggressively cut into the destination lane, making the lane change unsafe. The planning stack 418 could have already determined an alternative plan for such an event. Upon its occurrence, it could help direct the AV 402 to go around the block instead of blocking a current lane while waiting for an opening to change lanes.

The control stack 422 can manage the operation of the vehicle propulsion system 430, the braking system 432, the steering system 434, the safety system 436, and the cabin system 438. The control stack 422 can receive sensor signals from the sensor systems 404-408 as well as communicate with other stacks or components of the local computing device 410 or a remote system (e.g., the data center 450) to effectuate operation of the AV 402. For example, the control stack 422 can implement the final path or actions from the multiple paths or actions provided by the planning stack 418. This can involve turning the routes and decisions from the planning stack 418 into commands for the actuators that control the AV's steering, throttle, brake, and drive unit.

The communications stack 420 can transmit and receive signals between the various stacks and other components of the AV 402 and between the AV 402, the data center 450, the client computing device 470, and other remote systems. The communications stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 420 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 426 can store HD maps and related data of the streets upon which the AV 402 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408, stacks 412-422, and other components of the AV 402 and/or data received by the AV 402 from remote systems (e.g., the data center 450, the client computing device 470, etc.). In some examples, the raw AV data can include HD LIDAR point cloud data, image data, RADAR data, GPS data, and other sensor data that the data center 450 can use for creating or updating AV geospatial data or for creating simulations of situations encountered by AV 402 for future testing or training of various machine learning algorithms that are incorporated in the local computing device 410.

The data center 450 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform

456, a remote assistance platform 458, and a ridesharing platform 460, and a map management platform 462, among other systems.

The data management platform 452 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from a cartography platform (e.g., map management platform 462); modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 472. The client computing device 470 can be a customer's mobile computing device or a computing device integrated with the AV 402 (e.g., the local computing device 410). The ridesharing platform 460 can receive requests to pick up or drop off from the ridesharing application 472 and dispatch the AV 402 for the trip.

Map management platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, Unmanned Aerial Vehicles (UAVs), satellites, third-party mapping services, and other sources of geospatially referenced data. The raw data can be processed, and map management platform 462 can render base representations (e.g., tiles (2D), bounding volumes (3D), etc.) of the AV geospatial data to enable users to view, query, label, edit, and otherwise interact with the data. Map management platform 462 can manage workflows and tasks for operating on the AV geospatial data. Map management platform 462 can control access to the AV geospatial data, including granting or limiting access to the AV geospatial data based on user-based, role-based, group-based, task-based, and other attribute-based access control mechanisms. Map management platform 462 can provide version control for the AV geospatial data, such as to track specific changes that (human or machine) map editors have made to the data and to revert changes when necessary. Map management platform 462 can administer release management of the AV geospatial data, including distributing suitable iterations of the data to different users, computing devices, AVs, and other consumers of HD maps. Map management platform 462 can provide analytics regarding the AV geospatial data and related data, such as to generate insights relating to the throughput and quality of mapping tasks.

In some embodiments, the map viewing services of map management platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

While the autonomous vehicle 402, the local computing device 410, and the autonomous vehicle environment 400 are shown to include certain systems and components, one of ordinary skill will appreciate that the autonomous vehicle 402, the local computing device 410, and/or the autonomous vehicle environment 400 can include more or fewer systems and/or components than those shown in FIG. 4. For example, the autonomous vehicle 402 can include other services than those shown in FIG. 4 and the local computing device 410 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 4. An illustrative example of a computing device and hardware components that can be implemented with the local computing device 410 is described below with respect to FIG. 6.

Figure 5:
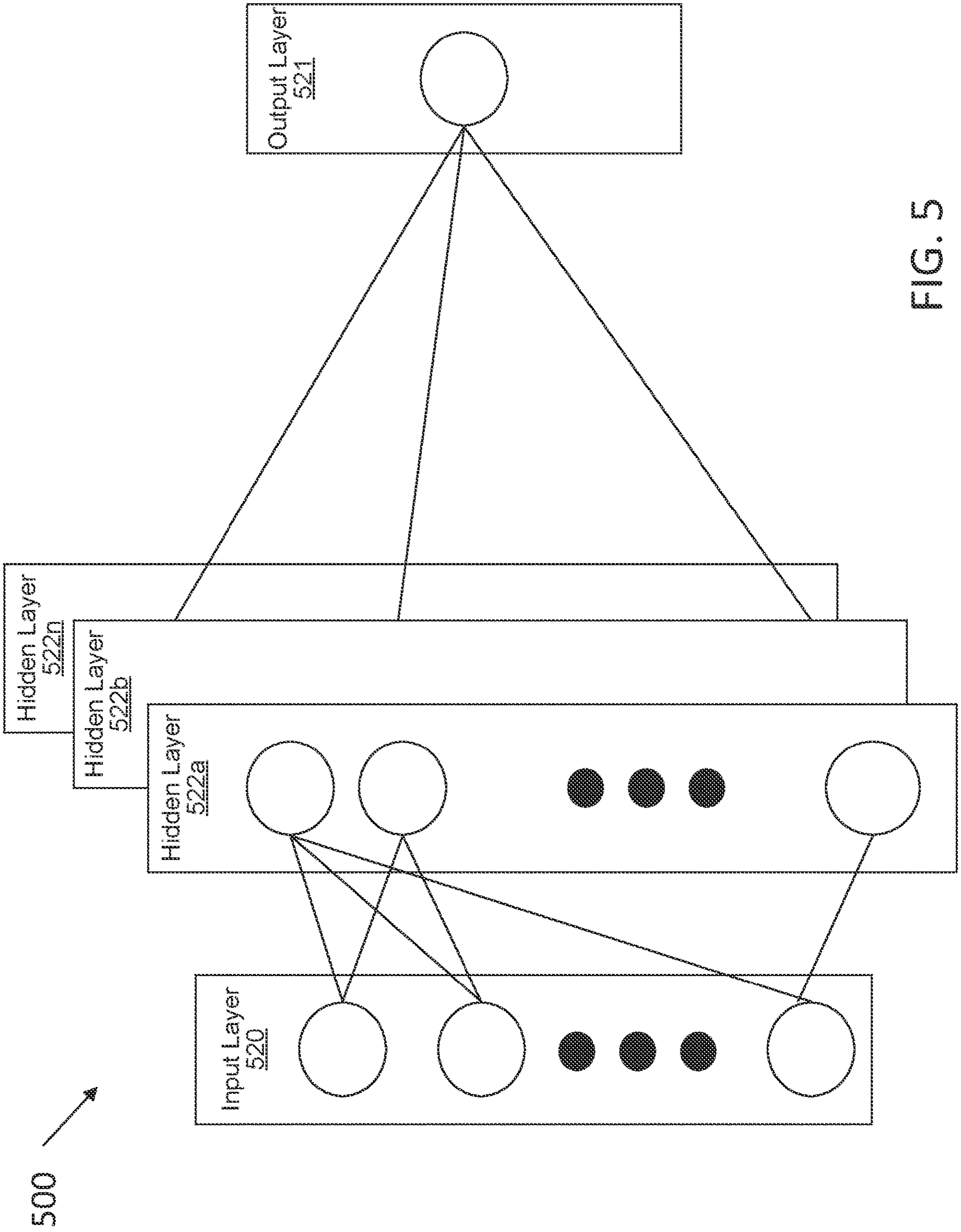
FIG. 5 illustrates an example of a deep learning neural network that can be used to perform one or more tasks, according to some aspects of the disclosed technology.

In FIG. 5, the disclosure now turns to a further discussion of models that can be implemented by systems and techniques described herein. FIG. 5 is an example of a deep learning neural network 500 that can be used to implement all or a portion of the systems and techniques described herein (e.g., neural network 500 can be used to perform one or more tasks related to the operation of an AV, as discussed above). For example, the deep learning neural network 500 can be used to implement any of the neural networks and sub-neural networks illustrated in FIG. 1 or 2. In another example, the deep learning neural network 500 can be used to implement the neural network and any of the sub-neural networks described above with respect to FIG. 3.

An input layer 520 can be configured to receive sensor data and/or data relating to an environment surrounding an AV. Neural network 500 includes multiple hidden layers 522*a*, 522*b*, through 522*n*. The hidden layers 522*a*, 522*b*, through 522*n* include "n" number of hidden layers, where "n" is an integer greater than or equal to one. The number of hidden layers can be made to include as many layers as needed for the given application. Neural network 500 further includes an output layer 521 that provides an output resulting from the processing performed by the hidden layers 522*a*, 522*b*, through 522*n*.

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522*a*. For example, as shown, each of the input nodes of the input layer 520 is connected to each of the nodes of the first hidden layer 522*a*. The nodes of the first hidden layer 522*a* can transform the information of each input node by applying activation functions to the input node information. The information derived from the transformation can then be passed to and can activate the nodes of the next hidden layer 522*b*, which can perform their own designated functions. Example functions include convolutional, up-sampling, data transformation, and/or any other suitable functions. The output of the hidden layer 522*b* can then activate nodes of the next hidden layer, and so on. The output of the last hidden layer 522*n* can activate one or more nodes of the output layer 521, at which an output is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522*a*, 522*b*, through 522*n* in order to provide the output through the output layer 521.

In some cases, the neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as E_total=Σ(½ (target−output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network 500 can perform a backward pass by determining which inputs (weights) most contributed to the loss of the network, and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
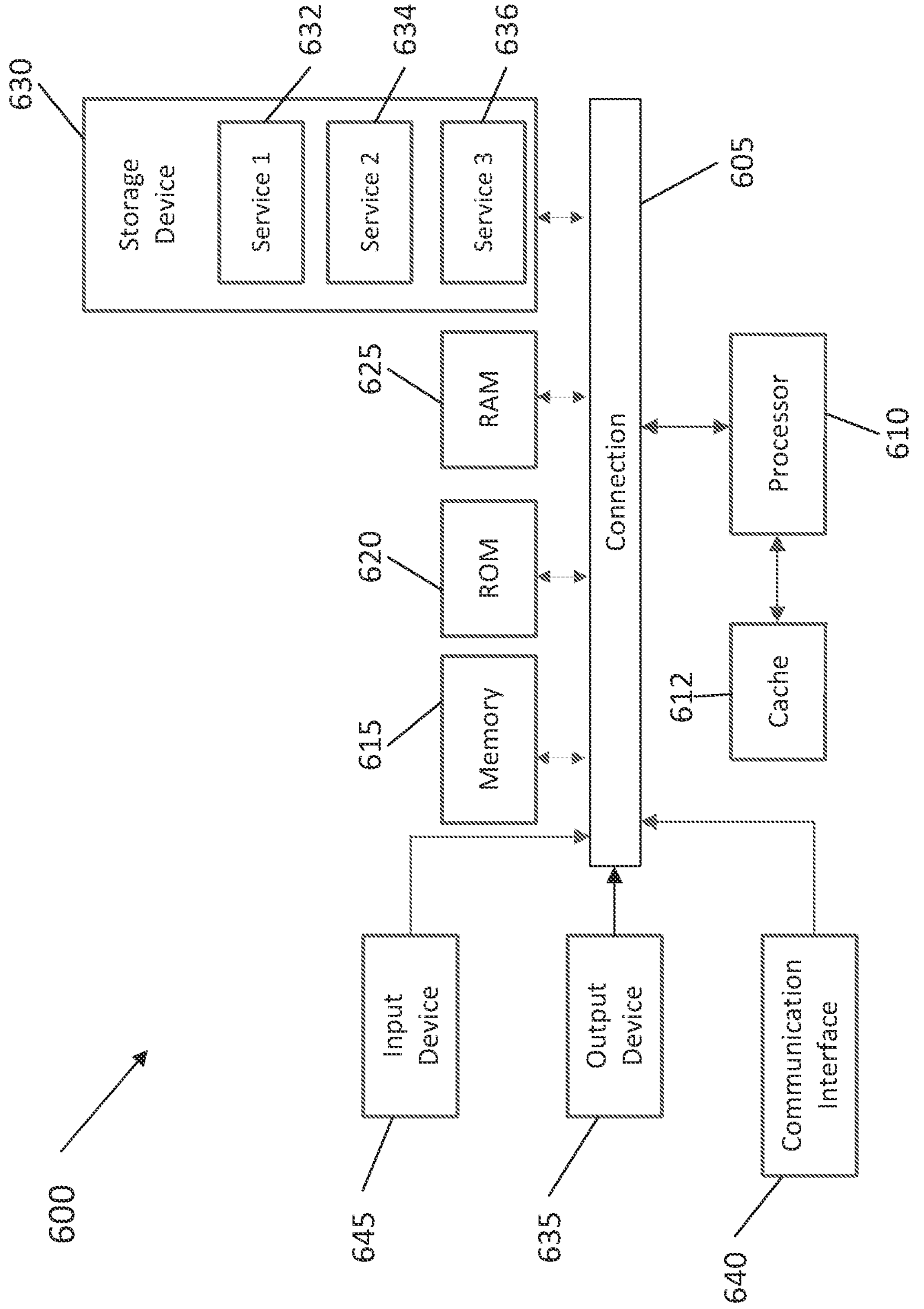
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Illustrative examples of the disclosure include:

Aspect 1. A method comprising: determining an operating condition for an autonomous vehicle; determining, from a plurality of sub-neural networks of a neural network, a sub-neural network configured for the operating condition, wherein each of the plurality of sub-neural networks is configured to perform a task based on a different operating condition for the autonomous vehicle; and performing the task using the sub-neural network configured for the operating condition.

Aspect 2. The method of Aspect 1, wherein the task comprises at least one of object detection, object tracking, object prediction, path planning, navigation, object recognition, object classification, semantic segmentation, panoptic segmentation, distance estimation, and motion planning.

Aspect 3. The method of Aspect 1 or 2, wherein the operating condition comprises at least one of a time-of-day condition, a weather condition, a geographic condition, a road condition, and a traffic condition.

Aspect 4. The method of any of Aspects 1 to 3, wherein two or more sub-neural networks of the plurality of sub-neural networks are configured to perform the task based on overlapping operating conditions.

Aspect 5. The method of any of Aspects 1 to 4, wherein determining the sub-neural network from the plurality of sub-neural networks of the neural network is based on at least one of a threshold and a change from a first operating condition to a second operation condition.

Aspect 6. The method of any of Aspects 1 to 5, further comprising loading the sub-neural network into at least one of a memory and a cache of an autonomous vehicle.

Aspect 7. The method of any of Aspects 1 to 6, wherein each sub-neural network from the plurality of sub-neural networks of the neural network is configured to perform the task based on a different combination of operating conditions associated with the autonomous vehicle.

Aspect 8. A system comprising: at least one memory; and at least one processor coupled to the at least one memory, the at least one processor configured to: determine an operating condition for an autonomous vehicle; determine, from a plurality of sub-neural networks of a neural network, a sub-neural network configured for the operating condition, wherein each of the plurality of sub-neural networks is configured to perform a task based on a different operating condition for the autonomous vehicle; and perform the task using the sub-neural network configured for the operating condition.

Aspect 9. The system of Aspect 8, wherein the task comprises at least one of object detection, object tracking, object prediction, path planning, navigation, object recognition, object classification, semantic segmentation, panoptic segmentation, distance estimation, and motion planning.

Aspect 10. The system of Aspect 8 or 9, wherein the operating condition comprises at least one of a time-of-day condition, a weather condition, a geographic condition, a road condition, and a traffic condition.

Aspect 11. The system of any of Aspects 8 to 10, wherein two or more sub-neural networks of the plurality of sub-neural networks are configured to perform the task based on overlapping operating conditions.

Aspect 12. The system of any of Aspects 8 to 11, wherein determining the sub-neural network from the plurality of sub-neural networks of the neural network is based on at least one of a threshold and a change from a first operating condition to a second operation condition.

Aspect 13. The system of any of Aspects 8 to 12, further comprising loading the sub-neural network into at least one of a memory and a cache of an autonomous vehicle.

Aspect 14. The system of any of Aspects 8 to 13, wherein each sub-neural network from the plurality of sub-neural networks of the neural network is configured to perform the task based on a different combination of operating conditions associated with the autonomous vehicle.

Aspect 15. A non-transitory computer-readable storage medium comprising at least one instruction for causing a computer or processor to: determine an operating condition for an autonomous vehicle; determine, from a plurality of sub-neural networks of a neural network, a sub-neural network configured for the operating condition, wherein each of the plurality of sub-neural networks is configured to perform a task based on a different operating condition for the autonomous vehicle; and perform the task using the sub-neural network configured for the operating condition.

Aspect 16. The non-transitory computer-readable storage medium of Aspect 15, wherein the task comprises at least one of object detection, object tracking, object prediction, path planning, navigation, object recognition, object classification, semantic segmentation, panoptic segmentation, distance estimation, and motion planning.

Aspect 17. The non-transitory computer-readable storage medium of Aspect 15 or 16, wherein the operating condition comprises at least one of a time-of-day condition, a weather condition, a geographic condition, a road condition, and a traffic condition.

Aspect 18. The non-transitory computer-readable storage medium of any of Aspects 15 to 17, wherein two or more sub-neural networks of the plurality of sub-neural networks are configured to perform the task based on overlapping operating conditions.

Aspect 19. The non-transitory computer-readable storage medium of any of Aspects 15 to 18, wherein determining the sub-neural network from the plurality of sub-neural networks of the neural network is based on at least one of a threshold and a change from a first operating condition to a second operation condition.

Aspect 20. The non-transitory computer-readable storage medium of any of Aspects 15 to 19, further comprising loading the sub-neural network into at least one of a memory and a cache of an autonomous vehicle.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:

determining, by at least one processor of an AV computing system, an operating condition for an autonomous vehicle (AV);

determining, by the at least one processor, from a plurality of sub-neural networks (SNNs) of a neural network stored on non-volatile memory of the AV, an SNN configured for the operating condition, wherein each of the plurality of SNNs is configured to perform a tasks based on a different operating condition for the AV;

instructing the AV computing system to load the SNN from the non-volatile memory into volatile memory or cache, and switching between ones of the plurality of SNNs responsive to changes, detected by the at least one processor, in the operating condition;

and performing the tasks using the SNN configured for the operating condition, wherein the plurality of SNNs is configured as a plurality of levels of SNNs, wherein each of the plurality of levels of SNNs has a respective plurality of SNNs, and wherein the plurality of levels of SNNs includes:

a first level of SNNs, wherein each of the plurality of SNNs in the first level of SNNs is respectively trained to perform the tasks segmented by first operational conditions; and a second level of SNNs, coupled to each of the plurality of SNNs in the first level of SNNs, wherein each of the plurality of SNNs in the second level of SNNs is respectively trained to perform the tasks segmented by second operational conditions, wherein the first and second operational conditions differ from each other; and wherein the task comprises at least one of object detection, object tracking, object prediction, path planning, navigation, object recognition, object classification, semantic segmentation, panoptic segmentation, distance estimation, and motion planning.

2. The method of claim 1, wherein the plurality of levels of SNNs includes a third level of SNNs, coupled to each of the plurality of SNNs in the second level of SNNs, wherein each of the plurality of SNNs in the third level of SNNs is respectively trained to perform tasks segmented by third operational conditions, wherein the first, second and third operational conditions differ from each other.

3. The method of claim 2, wherein each of the first, second and third operating conditions comprise at least one of a time-of-day condition, a weather condition, a geographic condition, a road condition, and a traffic condition.

4. The method of claim 1, wherein two or more sub-neural networks of the plurality of subneural networks are configured to perform the task based on overlapping operating conditions.

5. The method of claim 1, wherein determining the sub-neural network from the plurality of sub-neural networks of the neural network is based on at least one of a threshold and a change from a first operating condition to a second operation condition.

6. The method of claim 1, wherein each sub-neural network from the plurality of sub-neural networks of the neural network is configured to perform the task based on a different combination of operating conditions associated with the autonomous vehicle.

7. An autonomous vehicle (AV) computing system comprising:

at least one memory; and at least one processor coupled to the at least one memory, the at least one processor configured to:

determine, by the at least one processor of the AV computing system, an operating condition for an AV;

determine, by the at least one processor, from a plurality of sub-neural networks (SNNs) of a neural network stored on non-volatile memory of the AV, an SNN configured for the operating condition, wherein each of the plurality of SNNs is configured to perform tasks based on a different operating condition for the AV;

instruct the AV computing system to load the SNN from the non-volatile memory into volatile memory or cache, and switching between ones of the plurality of SNNs responsive to changes, detected by the at least one processor, in the operating condition;

and perform the tasks using the SNN configured for the operating condition, wherein the plurality of SNNs is configured as a plurality of levels of SNNs, wherein each of the plurality of levels of SNNs has a respective plurality of SNNs, and wherein the plurality of levels of SNNs includes:

a first level of SNNs, wherein each of the plurality of SNNs in the first level of SNNs is respectively trained to perform the tasks segmented by first operational conditions; and a second level of SNNs, coupled to each of the plurality of SNNs in the first level of SNNs, wherein each of the plurality of SNNs in the second level of SNNs is respectively trained to perform the tasks segmented by second operational conditions, wherein the first and second operational conditions differ from each other; and wherein the task comprises at least one of object detection, object tracking, object prediction, path planning, navigation, object recognition, object classification, semantic segmentation, panoptic segmentation, distance estimation, and motion planning.

8. The system of claim 7, wherein the plurality of levels of SNNs includes:

a third level of SNNs, coupled to each of the plurality of SNNs in the second level of SNNs, wherein each of the plurality of SNNs in the third level of SNNs is respectively trained to perform tasks segmented by third operational conditions, wherein the first, second and third operational conditions differ from each other.

9. The system of claim 7, wherein each of the first, second and third operating conditions comprises at least one of a time-of-day condition, a weather condition, a geographic condition, a road condition, and a traffic condition.

10. The system of claim 7, wherein two or more sub-neural networks of the plurality of subneural networks are configured to perform the task based on overlapping operating conditions.

11. The system of claim 7, wherein determining the sub-neural network from the plurality of sub-neural networks of the neural network is based on at least one of a threshold and a change from a first operating condition to a second operation condition.

12. The system of claim 7, wherein each sub-neural network from the plurality of sub-neural networks of the neural network is configured to perform the task based on a different combination of operating conditions associated with the autonomous vehicle.

13. A non-transitory computer-readable storage medium comprising at least one instruction for causing a computer or at least one processor to:

determine, by at least one processor of an autonomous vehicle (AV) computing system, an operating condition for an AV;

determine, by the at least one processor, from a plurality of sub-neural networks (SNNs) of a neural network stored on non-volatile memory of the AV, an SNN configured for the operating condition, wherein each of the plurality of SNNs is configured to perform tasks based on a different operating condition for the AV;

instruct the AV computing system to load the SNN from the non-volatile memory into volatile memory or cache, and switching between ones of the plurality of SNNs responsive to changes, detected by the at least one processor, in the operating condition;

and perform the tasks using the SNN configured for the operating condition, wherein the plurality of SNNs is configured as a plurality of levels of SNNs, wherein each of the plurality of levels of SNNs has a respective plurality of SNNs, and wherein the plurality of levels of SNNs includes:

a first level of SNNs, wherein each of the plurality of SNNs in the first level of SNNs is respectively trained to perform the tasks segmented by first operational conditions; and a second level of SNNs, coupled to each of the plurality of SNNs in the first level of SNNs, wherein each of the plurality of SNNs in the second level of SNNs is respectively trained to perform the tasks segmented by second operational conditions, wherein the first and second operational conditions differ from each other; and wherein the task comprises at least one of object detection, object tracking, object prediction, path planning, navigation, object recognition, object classification, semantic segmentation, panoptic segmentation, distance estimation, and motion planning.

14. The non-transitory computer-readable storage medium of claim 13, wherein the plurality of levels of SNNs includes:

a third level of SNNs, coupled to each of the plurality of SNNs in the second level of SNNs, wherein each of the plurality of SNNs in the third level of SNNs is respectively trained to perform tasks segmented by third operational conditions, wherein the first, second and third operational conditions differ from each other.

15. The non-transitory computer-readable storage medium of claim 13, wherein each of the first, second and third operating conditions comprises at least one of a time-of-day condition, a weather condition, a geographic condition, a road condition, and a traffic condition.

16. The non-transitory computer-readable storage medium of claim 13, wherein two or more sub-neural networks of the plurality of sub-neural networks are configured to perform the task based on overlapping operating conditions.

17. The non-transitory computer-readable storage medium of claim 13, wherein determining the sub-neural network from the plurality of sub-neural networks of the neural network is based on at least one of a threshold and a change from a first operating condition to a second operation condition.

* * * * *